(12) United States Patent
Thomas

(10) Patent No.: US 12,731,307 B1
(45) Date of Patent: Sep. 8, 2026

(54) TRIGGER-BASED GRAPHICAL OUTPUT GENERATION

(71) Applicant: Zoom Communications, Inc., San Jose, CA (US)

(72) Inventor: Timothy Robert Thomas, Castle Rock, CO (US)

(73) Assignee: Zoom Communications, Inc., San Jose, CA (US)

( * ) Notice: Subject to any disclaimer, the term of this patent is extended or adjusted under 35 U.S.C. 154(b) by 15 days.

(21) Appl. No.: 18/767,347

(22) Filed: Jul. 9, 2024

(51) Int. Cl.
*G06T 11/26* (2026.01)
*H04L 65/4038* (2022.01)
*H04N 7/15* (2006.01)

(52) U.S. Cl.
CPC .......... *G06T 11/26* (2026.01); *H04L 65/4038* (2013.01); *H04N 7/15* (2013.01)

(58) Field of Classification Search
CPC ...... G06T 11/206; H04L 65/4038; H04N 7/15
USPC .......................................................... 345/440
See application file for complete search history.

(56) References Cited

U.S. PATENT DOCUMENTS

2008/0112557 A1* 5/2008 Ricketts ................. G06Q 10/06 379/265.03
2008/0263460 A1* 10/2008 Altberg .................. G06Q 30/02 715/757
2022/0091726 A1* 3/2022 Azmoon ................ G06N 20/00
2022/0394232 A1* 12/2022 Rohit ................... H04N 13/194
2023/0117301 A1* 4/2023 Olivieri ................. H04L 65/403 348/14.07
2023/0195505 A1 6/2023 Represas et al.
2024/0394320 A1* 11/2024 Crudele .............. G06F 16/2282

FOREIGN PATENT DOCUMENTS

WO WO2025/165252 * 1/2025 ............ G06F 40/40

OTHER PUBLICATIONS

FinancesOnline, Pros and Cons of Templafy in 2024: A Popular Document Template Management Tool, <https://financesonline.com/pros-cons-templafy-popular-document-template-management-tool/> Jenny Chang, May 31, 2024, 11 pages.

* cited by examiner

*Primary Examiner* — Jin Ge
(74) *Attorney, Agent, or Firm* — Young Basile Hanlon & MacFarlane, P.C.

(57) ABSTRACT

Systems and methods for trigger-based graphical output generation are disclosed. A server obtains, from a client device, a data request specifying data for delivery, a delivery trigger, and a messaging address. The server obtains, in response to occurrence of the delivery trigger, the data from a data repository. The server determines, using a federated artificial intelligence engine, a visualization format for the data. The server generates a graphical output corresponding to the data in the visualization format. The server transmits, to the messaging address, the graphical output.

22 Claims, 10 Drawing Sheets

| ARTICLE OF CLOTHING | PERCENTAGE OF SALES |
|---|---|
| TROUSERS | 25% |
| SHOES | 12% |
| SHIRTS | 27% |
| JACKETS | 36% |

TRIGGER-BASED GRAPHICAL OUTPUT GENERATION

FIELD

This disclosure generally relates to electronic data visualization, and, more specifically, to generating a graphical output in response to a trigger.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
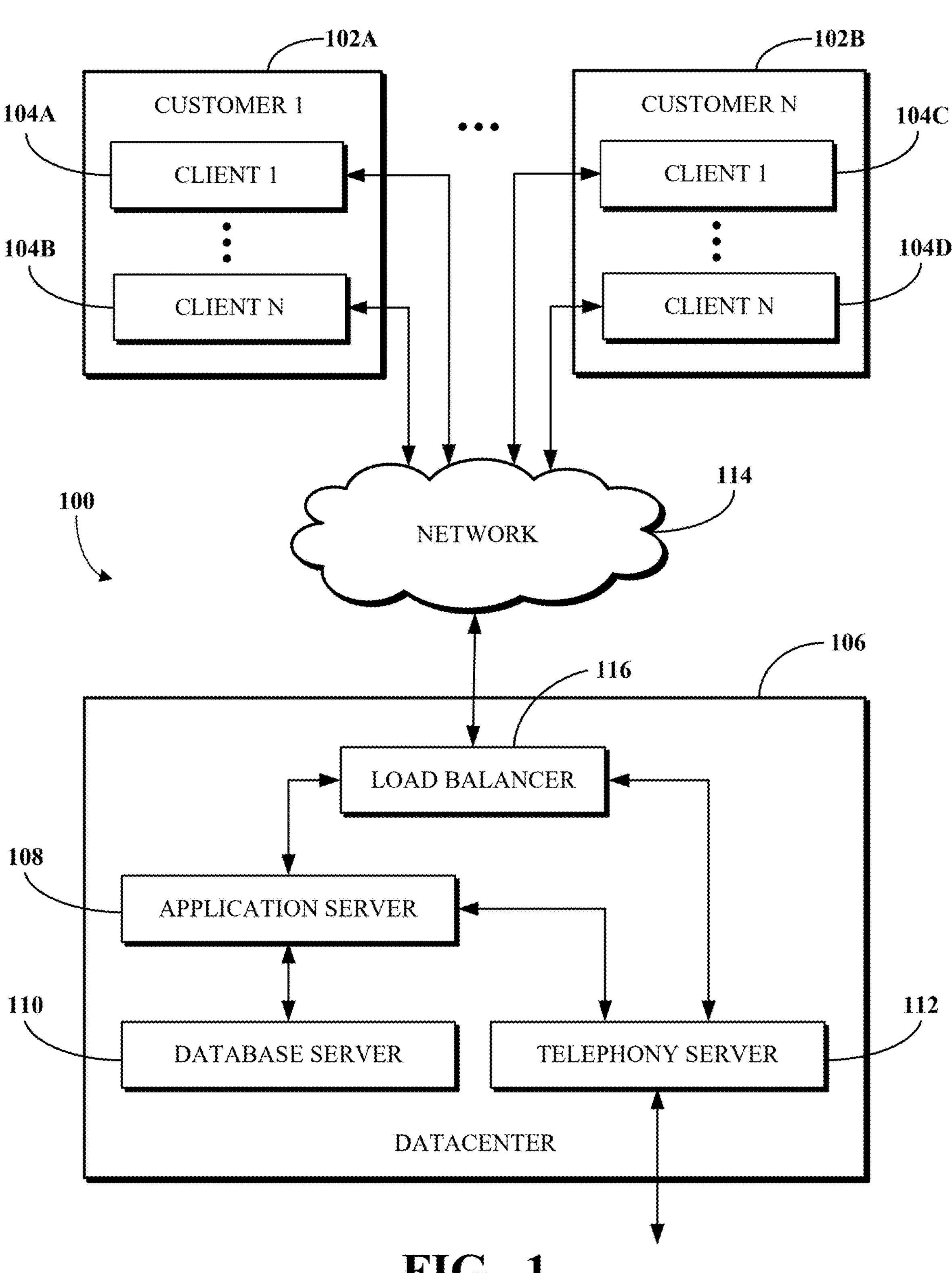
FIG. 1 is a block diagram of an example of an electronic computing and communications system.

Conferencing software is frequently used across various industries to support video-enabled conferences between participants in multiple locations. In some cases, each of the conference participants separately connects to the conferencing software from their own remote locations. In other cases, one or more of the conference participants may be physically located in and connect to the conferencing software from a conference room or similar physical space (e.g., in an office setting) while other conference participants connect to the conferencing software from one or more remote locations. Conferencing software thus enables people to conduct video conferences without requiring them to be physically present with one another. Conferencing software may be available as a standalone software product or it may be integrated within a software platform, such as a unified communications as a service (UCaaS) platform.

Users of video conferencing software may present in many different video conferences. For example, an executive might need to make a presentation to investors in a quarterly report video conference, to employees in an all-hands video conference, or to the legal team in a video conference to discuss legal matters. Oftentimes, a user might be unable to obtain the data needed for the presentation and generate slides based on the data, for example, due to time constraints. Alternatively, the user might spend time on generating slide presentation instead of engaging in other activities. As the foregoing illustrates, techniques for automating slide generation may be desirable. For example, on Monday morning after returning from a vacation, a sales manager might have a check-in conference with their boss and a proposal conference with a prospective buyer. Upon arriving at the office, the sales manager might not be able to adequately prepare for these conferences, and might end up attending these conferences without a slide presentation or with a poorly-generated slide presentation. The sales manager might use general purpose generative artificial intelligence (AI) solutions to generate the slide presentation. However, the slide presentation may be poorly generated by the general-purpose generative AI solutions because the general purpose generative AI solutions might not be trained to generate slide presentations for conferences, as generating such slide presentations is complex and might benefit from the use of multiple different AI technologies, rather than generative AI on its own.

Implementations of this disclosure address problems such as these by using artificial intelligence (AI) to automatically generate a graphical output representing data from a data repository in response to a trigger event (e.g., a current time being a threshold time before a video conference is scheduled to begin). A server obtains, from a client device, a data request. The data request specifies data to be delivered, a delivery trigger, and a messaging address. The messaging address may be, for example, an email address, an Internet Protocol (IP) address, an address in an instant messaging service, a session initiation protocol (SIP) address, or a telephone number (e.g., for use in short messaging service (SMS) or multimedia messaging service (MMS) communication). The data to be delivered may be, for example, a representation of in-store sales at stores of ABC Bookstore in each of their three locations. The delivery trigger may be, for example, at least one of a specific time (e.g., 9:00 AM Eastern Standard Time on the first Monday of each month) an occurrence of a video conference that mentions in-store sales in its title or description, the in-store sales in one of the stores reaching a first threshold value, or a request for a budget increase (e.g., for new employees or employee raises) being submitted. The messaging address may be an address of the client device, an email address, or an instant messaging address capable of receiving graphical data or links to graphical data.

The server may determine that the delivery trigger is occurring or has occurred, for example, by accessing a data repository that stores information (e.g., stock prices or in-store sales data) related to the trigger or by accessing other data (e.g., a time via a clock of the server or user calendar data that is accessible to the server). In response to occurrence of the delivery trigger, the server obtains the data to be delivered from the data repository. The server determines, using a federated AI engine, a visualization format for the data. The federated AI engine may include multiple different AI engines that work together. For example, the federated AI engine may include at least one of a large language model (LLM), a generative pretrained transformer (GPT), a convolutional neural network (CNN), or a statistical modeling engine. The visualization format may be at least one of a table, a bar graph, a pie graph, or a line graph. In some cases, the visualization format may specify that a slideshow presentation, using specified slideshow software, is to be generated for review or editing by the user before presentation in a video conference. The server generates a graphical output corresponding to the data in the visualization format. The server transmits the graphical output to the messaging address.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement a system for trigger-based graphical output generation. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
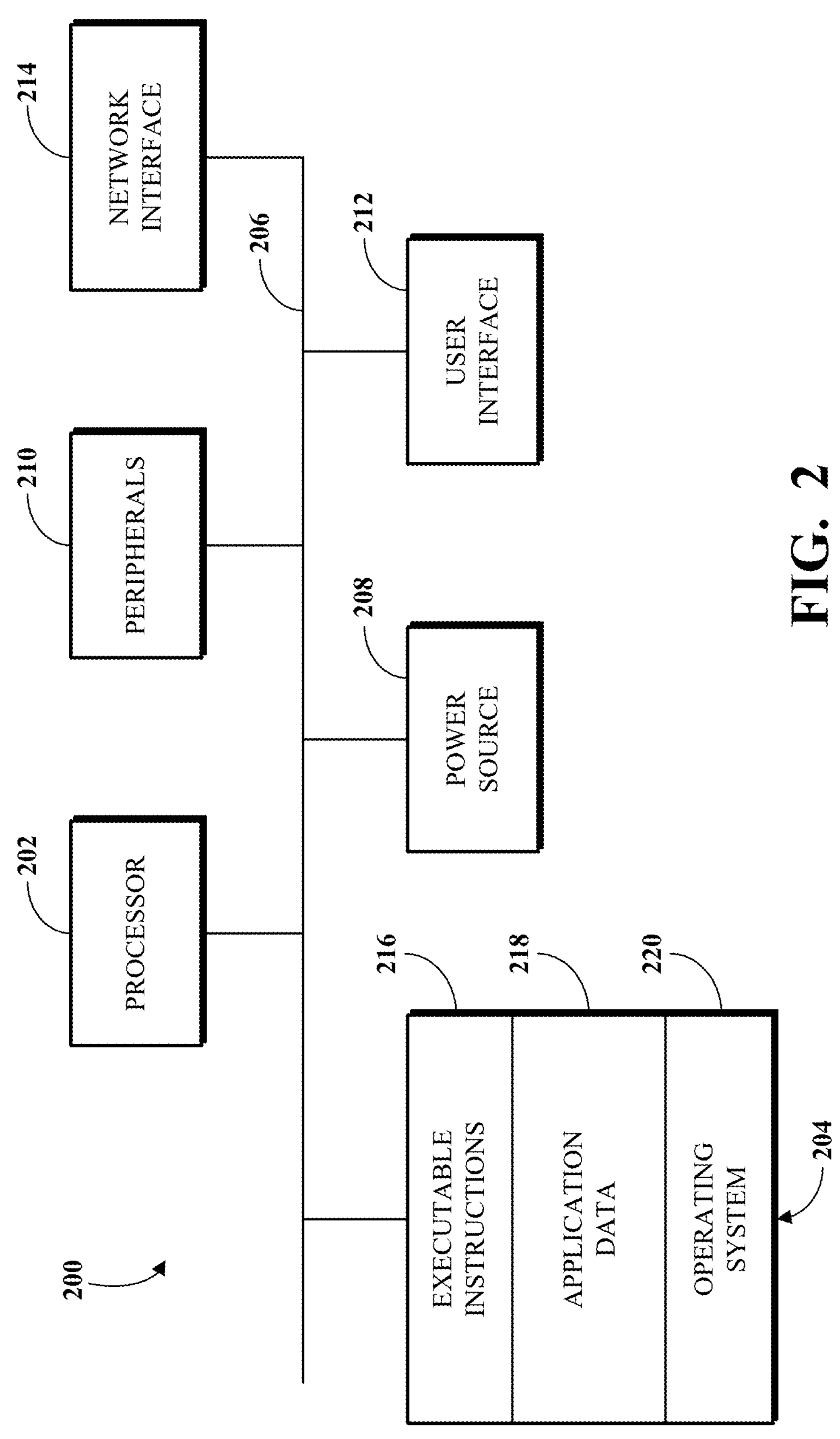
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
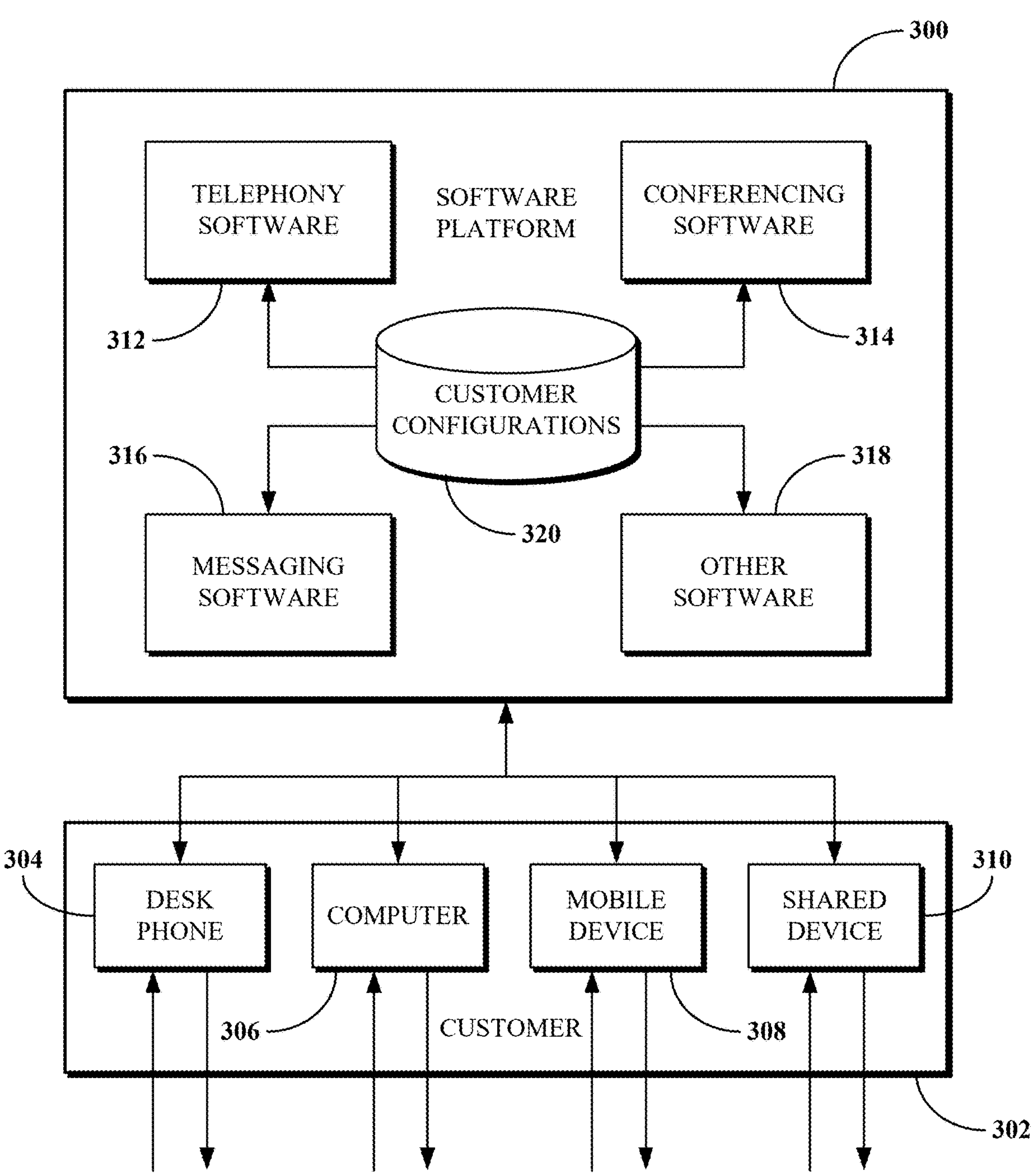
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients, including the desk phone 304, the computer 306, the mobile device 308, and the shared device 310, includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients, including the desk phone 304, the computer 306, the mobile device 308, and the shared device 310, and other telephony-enabled devices, which may be other ones of the clients 304, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for trigger-based graphical output generation.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients, including the desk phone 304, the computer 306, the mobile device 308, and the shared device 310.

Figure 4:
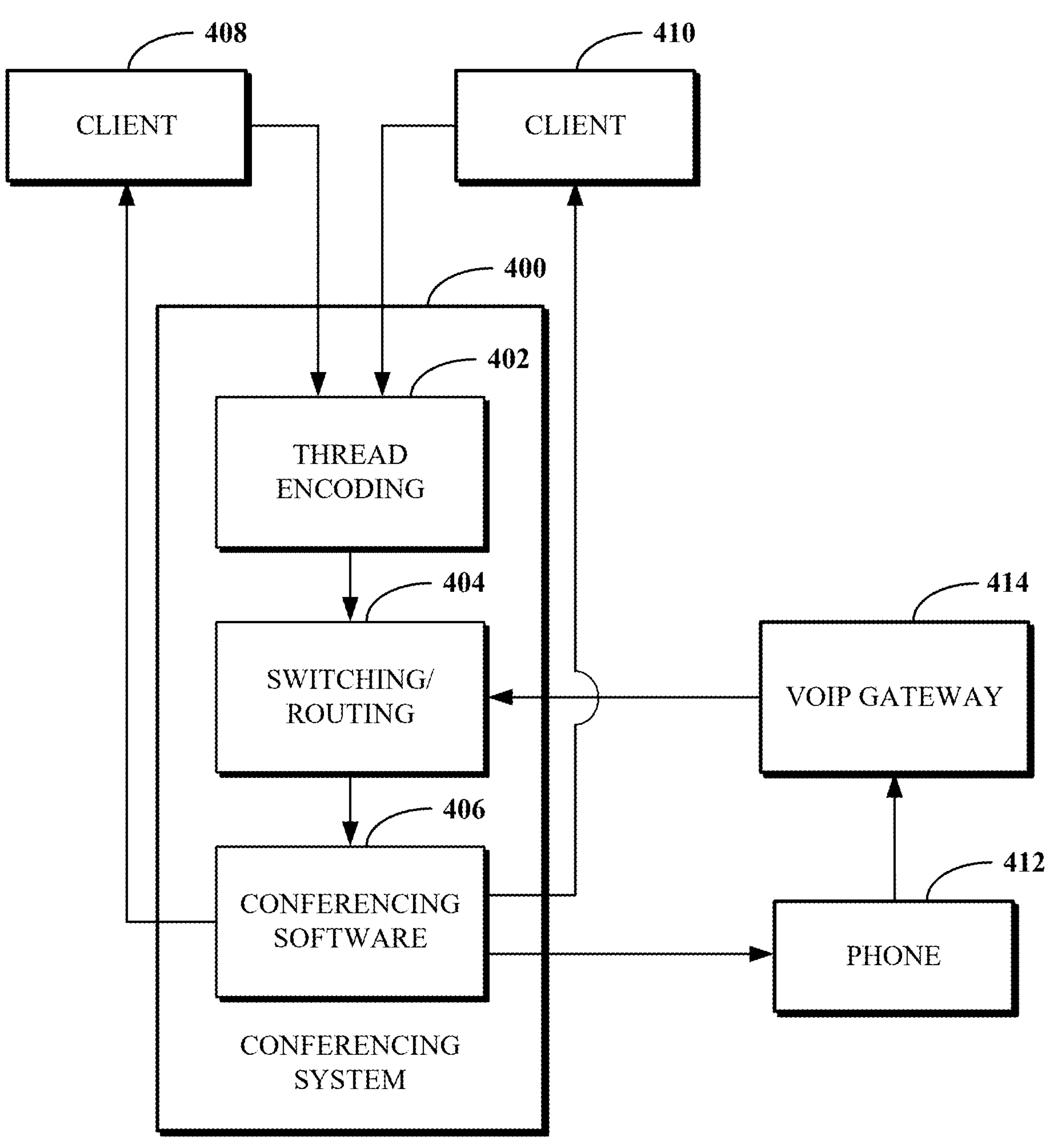
FIG. 4 is a block diagram of an example of a conferencing system for delivering conferencing software services in an electronic computing and communications system.

FIG. 4 is a block diagram of an example of a conferencing system 400 for delivering conferencing software services in an electronic computing and communications system, for example, the system 100 shown in FIG. 1. The conferencing system 400 includes a thread encoding tool 402, a switching/routing tool 404, and conferencing software 406. The conferencing software 406, which may, for example, the conferencing software 314 shown in FIG. 3, is software for implementing conferences (e.g., video conferences) between users of clients and/or phones, such as clients 408 and 410 and phone 412. For example, the clients 408 or 410 may each be one of the clients, including the a desk phone 304, the computer 306, the mobile device 308, and the shared device 310, shown in FIG. 3 that runs a client application associated with the conferencing software 406, and the phone 412 may be a telephone which does not run a client application associated with the conferencing software 406 or otherwise access a web application associated with the conferencing software 406. The conferencing system 400 may in at least some cases be implemented using one or more servers of the system 100, for example, the application server 108 shown in FIG. 1. Although two clients and a phone are shown in FIG. 4, other numbers of clients and/or other numbers of phones can connect to the conferencing system 400.

Implementing a conference includes transmitting and receiving video, audio, and/or other data between clients and/or phones, as applicable, of the conference participants. Each of the client 408, the client 410, and the phone 412 may connect through the conferencing system 400 using separate input streams to enable users thereof to participate in a conference together using the conferencing software 406. The various channels used for establishing connections between the clients 408 and 410 and the phone 412 may, for example, be based on the individual device capabilities of the clients 408 and 410 and the phone 412.

The conferencing software 406 includes a user interface tile for each input stream received and processed at the conferencing system 400. A user interface tile as used herein generally refers to a portion of a conferencing software user interface which displays information (e.g., a rendered video) associated with one or more conference participants. A user interface tile may, but need not, be generally rectangular. The size of a user interface tile may depend on one or more factors including the view style set for the conferencing software user interface at a given time and whether the one or more conference participants represented by the user interface tile are active speakers at a given time. The view style for the conferencing software user interface, which may be uniformly configured for all conference participants by a host of the subject conference or which may be individually configured by each conference participant, may be one of a gallery view in which all user interface tiles are similarly or identically sized and arranged in a generally grid layout or a speaker view in which one or more user interface tiles for active speakers are enlarged and arranged in a center position of the conferencing software user interface while the user interface tiles for other conference participants are reduced in size and arranged near an edge of the conferencing software user interface. In some cases, the view style or one or more other configurations related to the display of user interface tiles may be based on a type of video conference implemented using the conferencing software 406 (e.g., a participant-to-participant video conference, a contact center engagement video conference, or an online learning video conference, as will be described below).

The content of the user interface tile associated with a given participant may be dependent upon the source of the input stream for that participant. For example, where a participant accesses the conferencing software 406 from a client, such as the client 408 or 410, the user interface tile associated with that participant may include a video stream captured at the client and transmitted to the conferencing system 400, which is then transmitted from the conferencing system 400 to other clients for viewing by other participants (although the participant may optionally disable video features to suspend the video stream from being presented during some or all of the conference). In another example, where a participant access the conferencing software 406 from a phone, such as the phone 412, the user interface tile for the participant may be limited to a static image showing text (e.g., a name, telephone number, or other identifier associated with the participant or the phone 412) or other default background aspect since there is no video stream presented for that participant.

The thread encoding tool 402 receives video streams separately from the clients 408 and 410 and encodes those video streams using one or more transcoding tools, such as to produce variant streams at different resolutions. For example, a given video stream received from a client may be processed using multi-stream capabilities of the conferencing system 400 to result in multiple resolution versions of that video stream, including versions at 90p, 180p, 360p, 720p, and/or 1080p, amongst others. The video streams may be received from the clients over a network, for example, the network 114 shown in FIG. 1, or by a direct wired connection, such as using a universal serial bus (USB) connection or like coupling aspect. After the video streams are encoded, the switching/routing tool 404 direct the encoded streams through applicable network infrastructure and/or other hardware to deliver the encoded streams to the conferencing software 406. The conferencing software 406 transmits the encoded video streams to each connected client, such as the clients 408 and 410, which receive and decode the encoded video streams to output the video content thereof for display by video output components of the clients, such as within respective user interface tiles of a user interface of the conferencing software 406.

A user of the phone 412 participates in a conference using an audio-only connection and may be referred to an audio-only caller. To participate in the conference from the phone 412, an audio signal from the phone 412 is received and processed at a VOIP gateway 414 to prepare a digital telephony signal for processing at the conferencing system 400. The VOIP gateway 414 may be part of the system 100, for example, implemented at or in connection with a server of the datacenter 106, such as the telephony server 112 shown in FIG. 1. Alternatively, the VOIP gateway 414 may be located on the user-side, such as in a same location as the phone 412. The digital telephony signal is a packet switched signal transmitted to the switching/routing tool 404 for delivery to the conferencing software 406. The conferencing software 406 outputs an audio signal representing a combined audio capture for each participant of the conference for output by an audio output component of the phone 412. In some implementations, the VOIP gateway 414 may be omitted, for example, where the phone 412 is a VOIP-enabled phone.

A conference implemented using the conferencing software 406 may be referred to as a video conference in which video streaming is enabled for the conference participants thereof. The enabling of video streaming for a conference participant of a video conference does not require that the conference participant activate or otherwise use video functionality for participating in the video conference. For example, a conference may still be a video conference where none of the participants joining using clients turns on their video stream for any portion of the conference. In some cases, however, the conference may have video disabled, such as where each participant connects to the conference using a phone rather than a client, or where a host of the conference selectively configures the conference to exclude video functionality.

Figure 5:
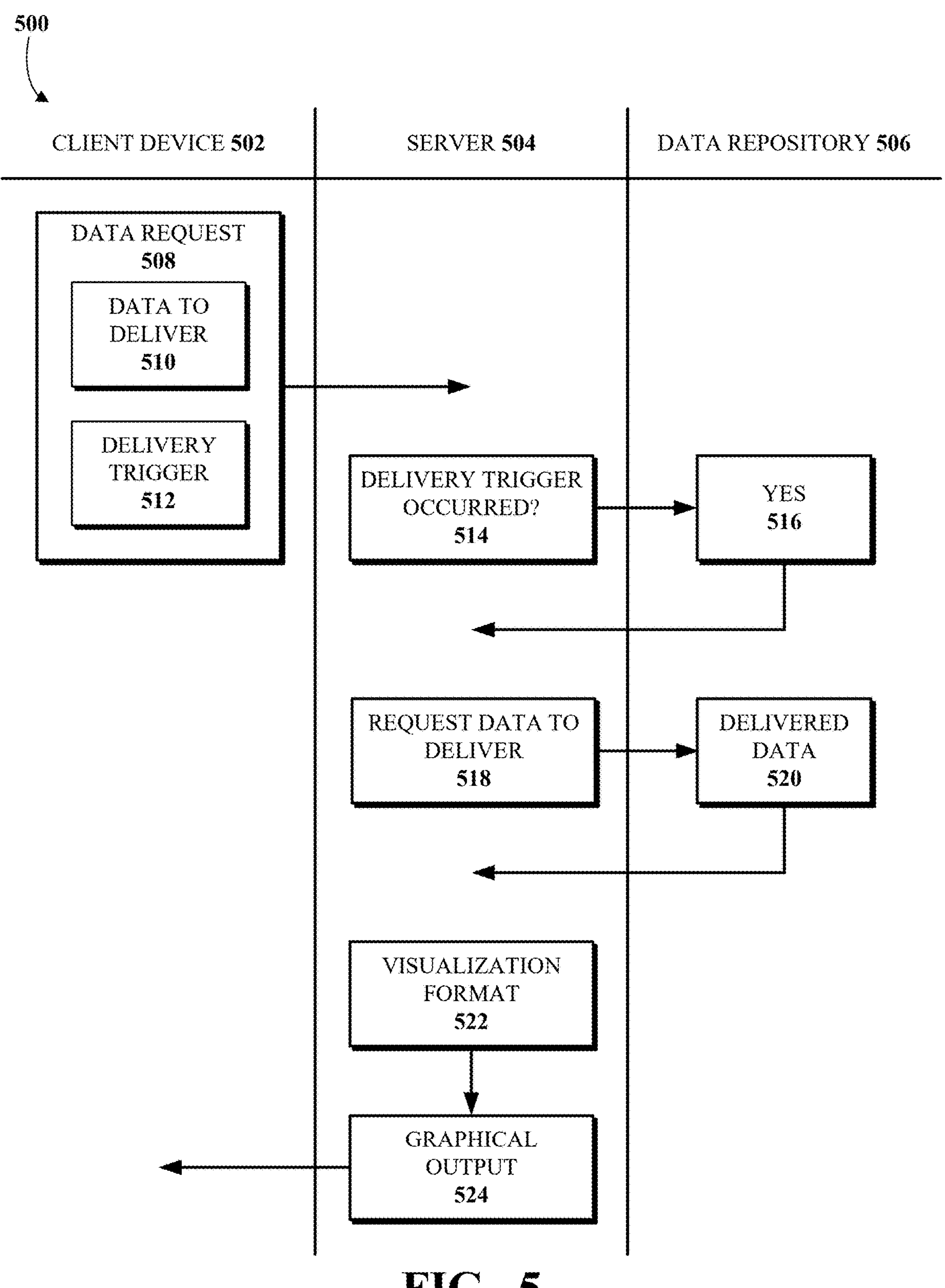
FIG. 5 is a data flow diagram of an example of trigger-based graphical output generation.

FIG. 5 is a data flow diagram of an example of trigger-based graphical output generation 500. As shown, the trigger-based graphical output generation 500 is implemented using a client device 502, a server 504, and a data repository 506. The client device 502 may be a device that includes processing circuitry and memory, for example, a laptop computer, a desktop computer, a tablet computer, a mobile phone, or a smartwatch. The server 504 may include a single server or multiple servers working together (e.g., in a server farm or another structure). The data repository 506 may be a database or another data store. According to some examples, the client device 502 corresponds to the client 408 or the client 410. The server 504 corresponds to at least one of a server of the conferencing system 400, the application server 108, the database server 110, or the telephony server 112. The data repository 506 corresponds to a database accessed by the database server 110 and/or a database of the datacenter 106.

As shown, the client device 502 generates a data request 508. The data request 508 indicates data to deliver 510 and a delivery trigger 512. The data to deliver 510 may be data stored in the data repository 506 or data that can be derived or calculated from the data stored in the data repository 506. The delivery trigger may correspond to a time (e.g., one hour before a video conference is to take place) or a trigger based on data (e.g., if a stock price drops 20% in a month, if in-store sales in a member of a set of stores increase by 10% or $10,000 in a month, or if a value derived from data in the data repository 506 exceeds a threshold or enters a range). In some cases, the delivery trigger 512 corresponds to a value stored in the data repository 506 being within a predetermined range (e.g., the costs of inventory acquired during the last month being between $100,000 and $200,000) or a mathematical function of at least one value stored in the data repository being within a predetermined range (e.g., the quotient of today's closing stock price divided by yesterday's closing stock price being greater than 1.08 or less than 0.94). In some cases, the data request 508 specifies a messaging address to which the data is to be delivered. The messaging address may be associated with the client device 502 or a user of the client device 502 (e.g., the user's email address).

In some use cases, the client device 502 generates the data request by a user navigating a graphical user interface (e.g., via a webpage or an application) to specify the data to deliver 510 and the delivery trigger. For example, a user might wish to receive a line graph of the stock price of a company during the previous three month when the stock price falls by 20% or more in the last month. Alternatively, the user might wish to receive a score of a baseball game after the baseball game is over.

In other use cases, the server obtains the data request 508 based on stored information of the client device 502 or stored information about the user of the client device 502. For example, a chief executive officer (CEO) of a company could be invited (e.g., via calendar software or video conferencing software) executing at the client device 502) to give a presentation (e.g., via the video conferencing software) about the company to the company's largest investors. In response, a transformer engine (e.g., a LLM or a GPT) of the server may determine that the CEO could benefit from having a presentation that indicates performance of the company's stock price and other financial data of the company, such as the company's sales, revenues, and costs. The transformer engine could generate the data request 508 with the delivery trigger 512 being a time 24 hours (or another time period) before the presentation and the data to deliver 510 being the performance of the company's stock price and the other financial data of the company.

The client device 502 transmits the data request 508 to the server 504, or the server 504 obtains the data request from the client device 502. The server 504 determines, at block 514, whether the delivery trigger 512 has occurred by consulting the data repository 506. At block 516, the server 504 receives, from the data repository 506, a signal that the delivery trigger 512 has occurred.

Upon occurrence of the delivery trigger 512, per block 516, the server 504 requests the data to delivery 510 from the data repository at block 518. In response, the data repository 506 provides the delivered data 520 (corresponding to the data to deliver 510 indicated in the data request 508) to the server 504.

The server 504 determines, using AI/ML techniques as described in greater detail below, (e.g., in conjunction with FIG. 7) a visualization format 522 for the delivered data 520. For some types of data, the visualization format 522 may be at least one of a table, a bar graph, a pie graph, or a line graph. For more complex types of data, the visualization format 522 may include a presentation that is openable or editable via slideshow software and/or a natural language text summary, explanation or interpretation of the data. In one use case, the visualization format 522 includes a first slide of a slideshow with a graph of a company's stock price over several months, and a second page of the slideshow with natural language text explaining why the company's stock price increased or decreased during each month, and a third page indicating key events that influenced the stock price. The server 504 generates, using the AI/ML techniques, a graphical output 524 representing the delivered data 520 in the visualization format 522. The server 504 transmits the graphical output to the client device 502 for display at the client device 502. Alternatively, the server 504 transmits the graphical output 524 to a messaging address specified via the client device 502. As a result, a user of the messaging address or the client device 502 may review and/or modify the graphical output 524 prior to presenting the graphical output 524. The review and/or modification may be done, for example, prior to presenting the graphical output 524 in a video conference or in-person conference or prior to submitting the graphical output to another person.

Figure 6:
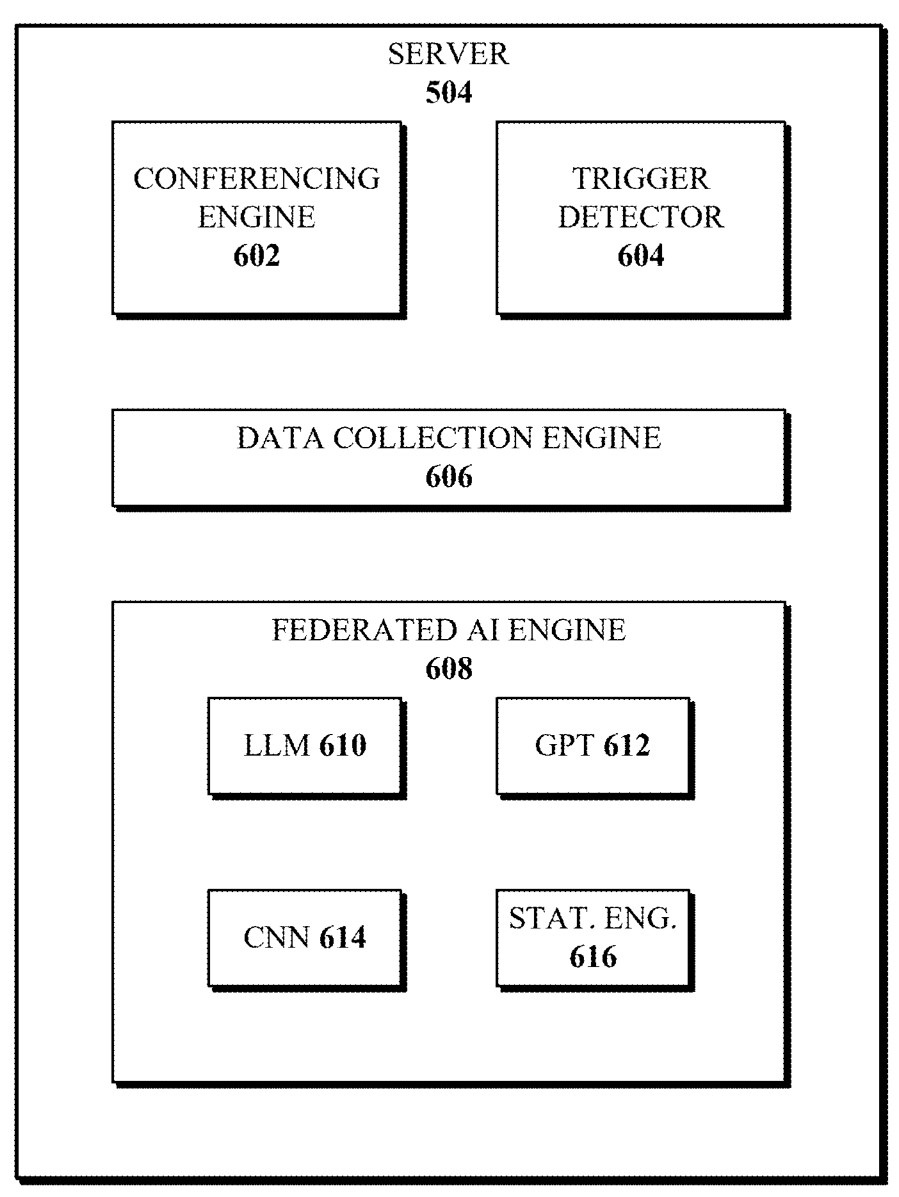
FIG. 6 is a block diagram of an example of a server for trigger-based graphical output generation.

FIG. 6 is a block diagram of an example of the server 504 for trigger-based graphical output generation. As shown, the server 504 includes a conferencing engine 602, a trigger detector 604, a data collection engine 606, and a federated AI engine 608.

The conferencing engine 602 may correspond to the conferencing software 406. The conferencing engine 602 may include software and/or hardware for scheduling a video conference, connecting client devices (e.g., the client device 502) to the video conference, and/or implementing the video conference.

The trigger detector 604 accesses the data repository 506 and determines, based on data in the data repository, whether the delivery trigger 512 for delivering data to the client device 502 is met. In some cases, the delivery trigger 512 corresponds to a time of a scheduled video conference. The trigger detector 604 accesses a clock and determines, based on the time specified by the clock and the time of the scheduled video conference, whether the delivery trigger 512 is met. For example, the delivery trigger 512 may be met when the current time specified by the clock is a threshold time (e.g., 24 hours, 1 hour, or 15 minutes) before the time of the scheduled video conference.

The data collection engine 606 obtains the data to deliver 510 from the data repository 506. For example, the data collection engine 606 may read data from the data repository 506 and/or make calculations based on the data from the data repository 506. In one example use case, the data to deliver 510 is the total sales amount of three locations of a bookstore and the data repository stores the sales amount at each location. The data collection engine 606 determines the total sales amount by calculating the sum of the sales amounts of the three locations that are obtained from the data repository 506.

The federated AI engine 608 determines the visualization format 522 for the delivered data 520 from the data repository 506 and generates the graphical output 524 corresponding to the data in the visualization format. As shown, the federated AI engine 608 includes multiple different AI engines, including an LLM 610, a GPT 612, a CNN 614, and a statistical engine (stat. eng.) 616. In alternative implementations, the federated AI engine 608 may include a portion of these multiple different AI engines and/or other AI engines that are not illustrated in FIG. 6.

In some implementations, determining the visualization format 522 may be accomplished based on the delivered data 520 from the data repository 506. If the delivered data 520 includes values across categories, without a specific emphasis on trends or proportions, the federated AI engine 608 may determine that a table may be used. Tables effectively display precise values for each category, making comparisons straightforward. For example, in the sales context, a table could list different products (e.g., different vehicles sold by a car dealer) with their corresponding sales figures.

However, if the delivered data 520 highlights comparisons between categorical values, the federated AI engine 608 may determine that a bar graph becomes a more fitting visualization format 522. Bar graphs visually represent the magnitude of values for each category, enabling easy identification of highest and lowest values. For example, the delivered data 520 may include data on customer satisfaction ratings for different services, which a bar graph could effectively convey.

Should the delivered data 520 represent parts of a whole, a pie graph could be the visualization format 522 selected by the federated AI engine 608. Pie graphs depict the proportion each category contributes to the total. For example, if the delivered data 520 includes information on the market share of various companies within an industry, a pie graph may illustrate each company's share relative to the whole market.

If the delivered data 520 showcases trends over time or continuous relationships between variables, the federated AI engine 608 may select a line graph as the visualization format 522. Line graphs effectively illustrate fluctuations or patterns in data points over time or across a spectrum. For example, if the delivered data 520 includes stock prices over a time period, a line graph may visually depict the price fluctuations throughout that time period.

The multiple different AI engines of the federated AI engine 608 may collaborate to determine the visualization format 522 for the delivered data 520. Determining the visualization format 522 may include following operations: data analysis and preparation by the LLM 610, the GPT 612, and the statistical engine 616; feature extraction by the CNN 614; and format selection by the federated AI engine 608.

In the data analysis and preparation operation, the LLM 610 and/or GPT 612 analyze the metadata accompanying the delivered data 520. The LLM 610 and/or the GPT 612 identify the data types (e.g., categorical, numerical, or temporal), the relationships between the variables, and the overall context of the delivered data 520. The statistical engine 616 performs descriptive statistics on the data, calculating measures including, for example, a mean, a median, a distribution, and/or potential correlations.

In the feature extraction operation, the CNN 614 extracts relevant features from the delivered data 520. The relevant features may correspond to features that could be represented with images or visual patterns. For example, the CNN may be trained, based on the values in the delivered data 520 to determine which visualization format from a set of formats is optimal. The visualization format may depend on the relationships between the values in the delivered data. For example, a pie graph may optimally represent the relationship of sales between stores if a first store had sales of $20,000, a second store had sales of $30,000, and a third store had sales of $50,000. However, a table may optimally represent the relationship of the sales between the stores if the first store had sales of $400, the second store had sales of $600, and a third store had sales of $99,000, as the first store and second store might be barely visible (e.g., to a typical human eye observing the graphical output 524 on a computer screen or on paper) in the pie graph in the latter case.

In the format recommendation operation, the LLM 610 and/or the GPT 612 combine their understanding of the meaning and/or context of the delivered data 520 with the statistical insights from the statistical engine 616 and/or the feature extraction insights from the CNN 614. Collectively, the multiple engines of the federated AI engine 608 weigh the strengths and weaknesses of different visualization formats (e.g., tables, bar graphs, pie charts, and/or line graphs) based on the analyzed data characteristics.

To make a final decision for the visualization format 522, the federated AI engine 608 determines the visualization format 522 that best communicates the information contained in the delivered data 520. This determination may be based on a combination of statistical suitability, contextual relevance, and/or visual feature alignment. By integrating the strengths of language models (the LLM 610 and/or the GPT 612) and statistical analysis (by the CNN 614 and/or the statistical engine 616), the federated AI engine 608 is able to automatically select the visualization format for the delivered data 520.

After selecting the visualization format, the federated AI engine 608 generates the graphical output 524. For example, the LLM 610 and/or the GPT 612 may be used to generate natural language text associated with the graphical output 524. The natural language text may include labels for components (e.g., lines or sections of graphs) of the graphical output 524 and/or a natural language explanation of the graphical output 524. At least one of the LLM 610, the GPT 612, or the CNN 614 may generate the graphical output itself, for example, the table, the bar graph, the pie chart, and/or the line graph.

In some cases, the GPT 612 is trained using a two-phase process including the phases of pretraining and finetuning. In the pretraining phase, the GPT 612 is trained on the natural language data, which may include various publicly available (e.g., from the Internet) text data or audio/video data that is converted into text using speech-to-text technology. The publicly available text data may include text that is distinct from user input typically provided to the GPT 612 (e.g., the delivered data 520 from the data repository 506). For example, the various publicly available text data may include at least one of newspaper articles, blog posts, publicly available social media posts, or encyclopedia articles. The text is used to create a language model that learns to predict the next word in a sentence given the context of the previous words. The transformer architecture, specifically the self-attention mechanism, may be used to capture dependencies between words and create a representation of the text.

During pretraining, the GPT 612 learns to generalize the patterns it observes in the training data. Specifically, the GPT 612 learns grammar, facts, reasoning abilities, and some level of world knowledge. The pretraining phase allows the GPT 612 to acquire a broad understanding of the natural languages in which the GPT 612 is trained. The GPT 612 may be trained to operate in multiple natural languages. For example, the GPT 612 may be operated in English for English speaking users, in Spanish for Spanish speaking users, and/or in Japanese for Japanese speaking users.

During the finetuning phase, after pre-training, the GPT 612 is further finetuned on specific tasks (e.g., at least one of data analysis and preparation, format recommendation, or graphical output generation) using labeled examples. The labeled examples may be publicly available graphical outputs for publicly available datasets, for example, graphs or charts shown on public television that correspond to publicly available data and/or stock price charts or weather charts that are available to the public. The labeled examples may include human-generated labels for how well a given graphical output captures a given dataset. The GPT 612 may be trained to generate graphical outputs, such as the graphical output 524, using the labeled examples. The finetuning phase makes the GPT 612 useful for specific applications, such as at least one of data analysis and preparation, format recommendation, or graphical output generation. Finetuning involves training the GPT 612 on a narrower dataset that may be generated with the help of human reviewers (e.g., who might manually perform the data analysis and preparation, the format recommendation, or the graphical output generation).

The finetuning phase includes providing prompts or instructions to the GPT 612 and receiving responses from the GPT 612. For example, a human reviewer may generate format recommendations and graphical outputs for various publicly available datasets. The human reviewer then provides the format recommendations and the graphical outputs to the GPT 612 as training data for training the GPT 612. The GPT 612 uses reinforcement learning to attempt to improve its scores on how closely format recommendations and graphical outputs generated by the GPT 612 match the human-generated format recommendations and outputs in the training data. The LLM 610 may be trained in a similar manner to the GPT 612, using similar pretraining and finetuning phases.

The CNN 614 may be trained to classify various datasets as corresponding to different visualization types (e.g., the table, the bar graph, the pie graph, or the line graph) using training data that includes publicly available datasets that are manually associated with visualization types by human reviewers. The human reviewers may manually tag each dataset as corresponding to a visualization type for generating the training dataset for the CNN 614.

The statistical engine 616 may be programmed to calculate various statistical values (e.g., at least one of mean, median, mode, range, best fit line, best fit curve, or r^2 value). In some cases, the statistical engine 616 may interface with at least one of the LLM 610, the GPT 612, or the CNN 614 to determine which statistical values are to be calculated.

It should be noted that the federated AI engine 608 and all of the engines included in the federated AI engine 608 (e.g., the LLM 610, the GPT 612, the CNN 614, and the statistical engine 616) are trained using publicly available data and/or data generated by humans (e.g., who are employed by an entity associated with the federated AI engine 608) specifically for the purpose of training AI engines. No private data (e.g., customer data of the entity) is used to train the federated AI engine 608.

Figure 7:
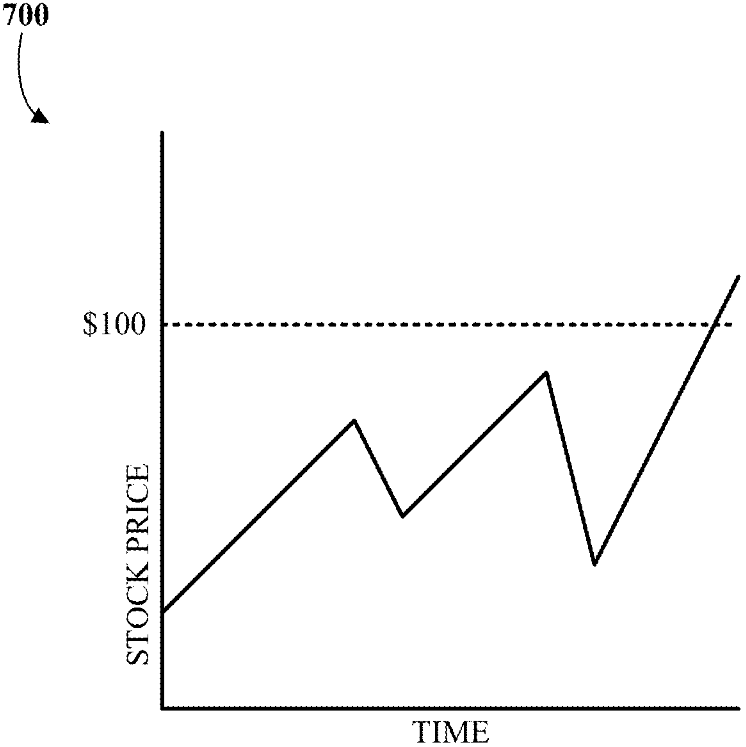
FIG. 7 illustrates a first example of a graphical output that may be generated using the techniques disclosed herein.

FIG. 7 illustrates a first example of a graphical output 700 that may be generated using the techniques disclosed herein. The graphical output 700 may be an example of the graphical output 524. As illustrated, the graphical output 700 is a line graph of stock price versus time. The level of $100 is indicated on the stock price axis of the line graph and was reached close to the end (highest time value) of the line graph. This may correspond to the stock price reaching $100 being the delivery trigger 512 associated with this graphical output 700. The delivery trigger 512 is indicated in the graphical output 700 to make it easy for a user viewing the graphical output 700 to recognize why the graphical output 700 is meaningful. If the user manually sets the delivery trigger 512, the user may be reminded of the delivery trigger 512 in the graphical output 700.

Figure 8:
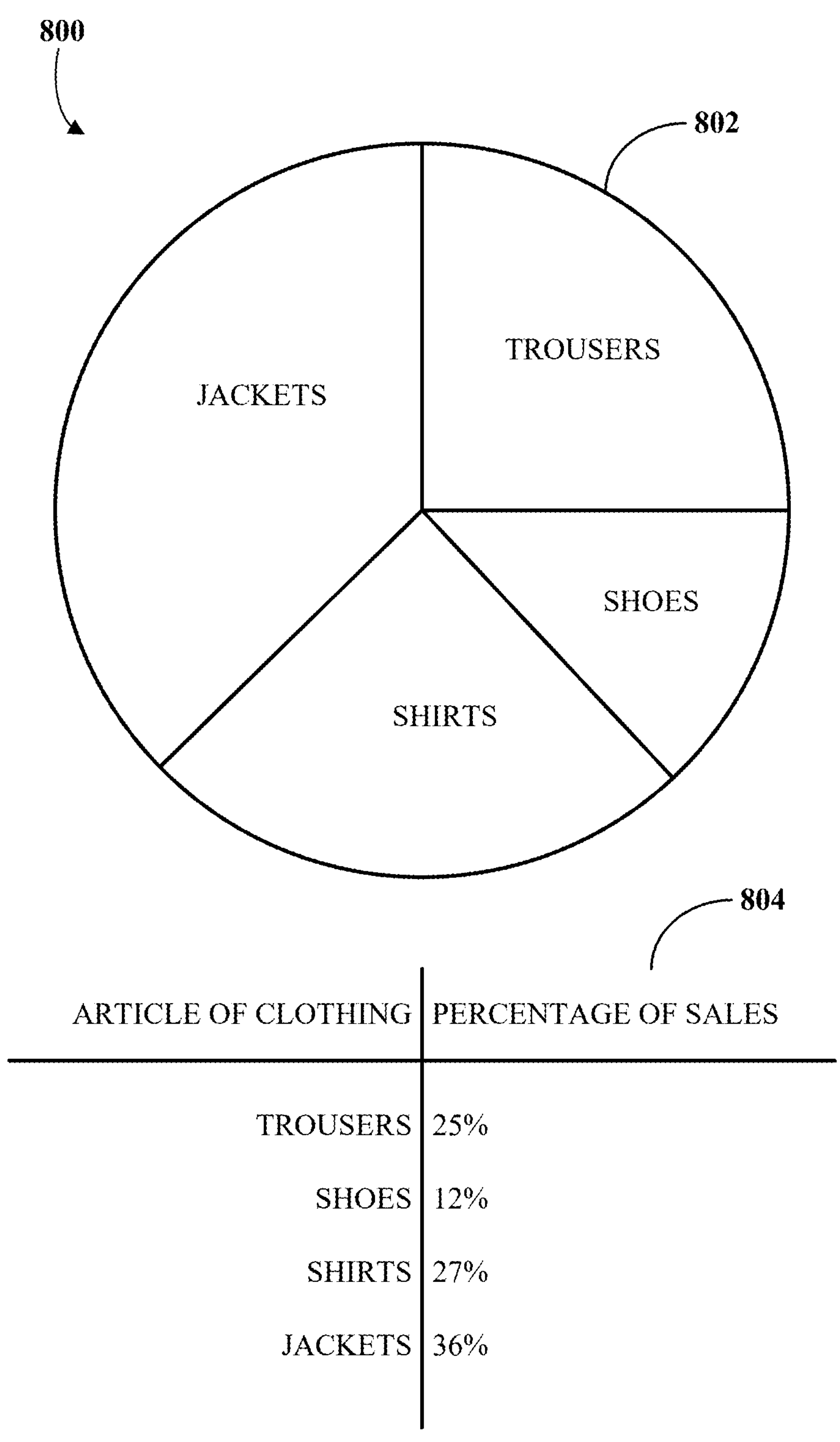
FIG. 8 illustrates a second example of a graphical output that may be generated using the techniques disclosed herein.

FIG. 8 illustrates a second example of a graphical output 800 that may be generated using the techniques disclosed herein. The graphical output 800 may be an example of the graphical output 524. As illustrated, the graphical output includes a pie chart 802 and a table 804 corresponding to the pie chart 802. The table 804 specifies the percentage of sales for the articles of clothing—trousers, shoes, shirts, and jackets—that are sold by a clothing retailer. The pie chart 802 graphically illustrates the information in the table 804, with each "slice" of the circular "pie" having a size corresponding to the percentage of sales of the associated article of clothing. For example, for the article of clothing "trousers," the percentage of sales is 25%, so the "trousers" slice of the pie occupies 25% of the pie.

FIGS. 7-8 illustrate graphical outputs that are displayed on a single page. In other examples, the graphical output 524 may include multiple pages or slides and multiple visual items on the multiple pages. For example, a first page or slide of the graphical output 524 may include a pie chart and a second page or slide of the graphical output 524 may include a table. Each of the pie chart and the table may include natural language text describing the content of the table. In some cases, the pages or slides may include a format, a watermark, or other visual indicia that are specified by the user or an administrator associated with an employer or other entity associated with the user.

In one example use case of the disclosed technology, a manager of a men's clothing store in New York City uses the client device 502 to create a video conference titled "monthly sales presentation" and invites executives of the clothing store to attend the video conference. Based on this video conference being created, the server 504 determines that the data to deliver 510 may include data for the "monthly sales presentation," and the delivery trigger 512 is a time before the "monthly sales presentation." As the manager might desire to edit graphical output for the presentation before using it, the delivery trigger 512 is set to 24 hours before the time of the "monthly sales presentation."

Upon occurrence of the delivery trigger 512 or a predetermined time before the occurrence to allow for the execution of AI algorithms, the server requests sales data from the data repository 506. The sales data indicates the dollar value of sales of different articles of clothing—trousers, shoes, shirts, and jackets—in the New York City location of the men's clothing retailer. Based on the obtained sales data, the server generates a slideshow file including a slide for the pie chart 802 and a slide for the table 804.

To generate additional content for the "monthly sales presentation," the server 504 reviews publicly available social media profiles of the executives to attend the "monthly sales presentation." Based on these publicly available social media profiles, the server 504 determines that the executives are interested in the stock price of the men's clothing retailer, which has recently passed $100 for the first time. Based on this information, the server adds a slide including the line graph (in the graphical output 700) of the stock price to the slideshow presentation of the manager.

The server further determines, based on the publicly available social media data, that one of the executives speaks Japanese and does not speak English, while the manager speaks English and does not speak Japanese. In order to make the "monthly sales presentation" accessible to the Japanese speaker, the server 504 translates the English text of the slideshow presentation into Japanese and proposes a setting for the video conference that would enable real-time translation of speech from English into Japanese using dubbing or subtitling.

After generating the slideshow presentation, the server 504 emails the slideshow presentation to an email address of the manager. The email may include an attachment of the slideshow presentation, as well as natural language text describing the slides of the slideshow presentation and why they were selected for inclusion in the slideshow presentation. The natural language text may be generated by the LLM 610 or the GPT 612.

Upon receiving the slideshow presentation, the manager may choose to present the slideshow presentation in the "monthly sales presentation" video conference. In some cases, the manager may edit the slideshow presentation.

Figure 9:
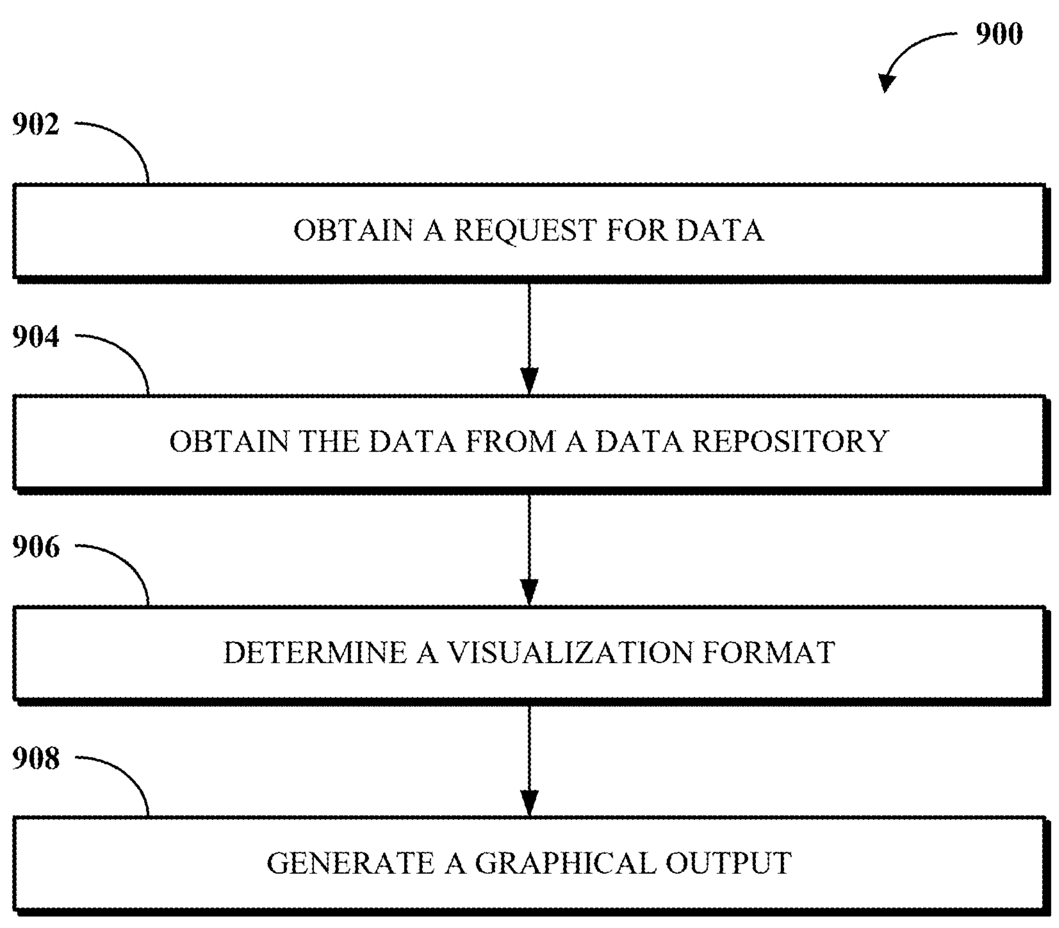
FIG. 9 is a flowchart of an example of a technique for trigger-based graphical output generation.
Figure 10:
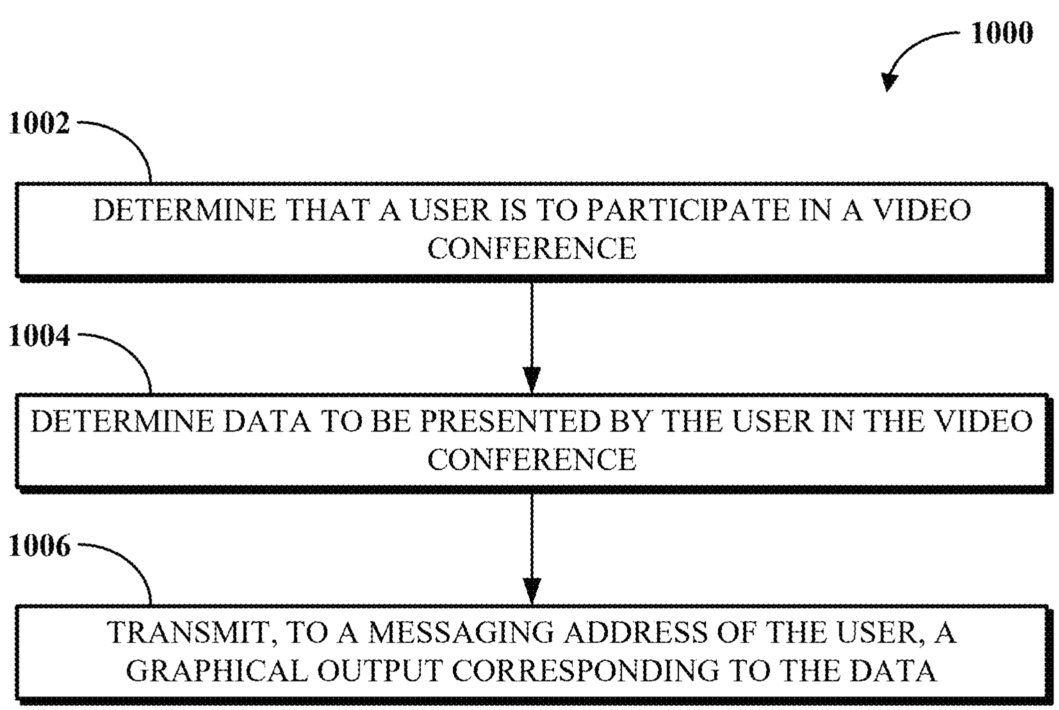
FIG. 10 is a flowchart of an example of a technique for generating a graphical output for presentation in a video conference.

To further describe some implementations in greater detail, reference is next made to examples of techniques which may be performed by or using a system for trigger-based graphical output generation. FIG. 9 is a flowchart of an example of a technique 900 for trigger-based graphical output generation. FIG. 10 is a flowchart of an example of a technique 1000 for generating a graphical output for presentation in a video conference. The techniques 900 or 1000 can be executed using computing devices, such as the systems, hardware, and software described with respect to FIGS. 1-8. The techniques 900 or 1000 can be performed, for example, by executing a machine-readable program or other computer-executable instructions, such as routines, instructions, programs, or other code. The steps, or operations, of the techniques 900, 1000, or another technique, method, process, or algorithm described in connection with the implementations disclosed herein can be implemented directly in hardware, firmware, software executed by hardware, circuitry, or a combination thereof.

For simplicity of explanation, the techniques 900, 1000 are depicted and described herein as series of steps or operations. However, the steps or operations of the techniques 900 or 1000 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

FIG. 9 illustrates the technique 900 for trigger-based graphical output generation. The technique 900 may be performed by one or more servers (e.g., the server 504).

At 902, the server obtains, from a client device, a data request specifying data to be delivered, a delivery trigger, and a messaging address. For example, the server may determine, based on a calendar stored or edited at the client device, that a user of the client device is to attend a video conference at a future time. The server may set the delivery trigger to be a threshold time before the future time. The server may set the data request to correspond to data that would be useful to the user in the video conference. For example, the data may be determined, using GPT or LLM techniques, based on a title of the video conference or participants in the video conference. The server may set the messaging address to an email address of the user.

At 904, the server obtains, in response to occurrence of the delivery trigger, the data from a data repository. For example, the server may use a trigger detector (e.g., the trigger detector 604) to detect the occurrence of the delivery trigger. The server may use a data collection engine (e.g., the data collection engine 606) to obtain the data from the data repository. In some cases, the server determines occurrence of the delivery trigger (e.g., determines that the delivery trigger is occurring or has recently occurred) by tracking, using a tracking engine that periodically accesses the data repository, changes to values stored in the data repository. The tracking engine resides at the server. The tracking engine periodically reads data from the data repository. In some cases, the tracking engine reads the data associated with the delivery trigger. In some cases, the tracking engine reads multiple different data values associated with multiple different delivery triggers (including the delivery trigger) being processed by the server.

At 906, the server determines, using a federated AI engine (e.g., the federated AI engine 608), a visualization format for the data. In some cases, the visualization format corresponds to a slide presentation or a slide show that includes multiple slides. The visualization format may specify the content of each slide. For example, the content of a slide may include a graph or a table depicting data from the data repository 506 and natural language text explaining that data.

At 908, the server generates a graphical output corresponding to the data in the visualization format. The server transmits the graphical output to the messaging address. In some examples, the server generates, by the federated AI engine, a slide presentation related to the data. The slide presentation may be stored in a slideshow file or in another format. The server transmits the slide presentation to the messaging address. The slide presentation may include the graphical output, or the graphical output may include the slide presentation.

FIG. 10 illustrates the technique 1000 for generating a graphical output for presentation in a video conference. The technique 1000 may be performed by one or more servers (e.g., the server 504). In some cases, the technique 1000 is performed in conjunction with the technique 900. Alternatively, the technique 1000 may be performed separately from the technique 900.

At 1002, the server determines that a user of the client device is to participate in a video conference. The server may determine that the user is to participate in the video conference based on a calendar associated with the user, an email account associated with the user, or a video conferencing application account associated with the user. In some cases, the server is associated with at least one of the email account, the calendar account, or the video conferencing application account. Alternatively, the user provides their affirmative consent for the server to access their email account, their calendar account, or their video conferencing application account for the purpose of obtaining AI assistance with preparing for conferences. In some cases, the server determines a delivery trigger (e.g., the delivery trigger 512) for delivering data to the client device based on a time of the video conference. For example, the delivery trigger may correspond to the time of the video conference or may occur 15 minutes, one hour, two hours, one day, or two days before the video conference.

At 1004, the server determines, based on stored information about the video conference and using a federated artificial intelligence engine, data to be presented by the user in the video conference. The server may determine the data to be presented by the user based on at least one of the title of the video conference, the participants in the video conference, and/or a role of the user. In one example use case, the title of the video conference is "quarterly report," the user is the CEO of the company, and the other participants are investors or board members of the company. As a result, the server may determine that financial information (e.g., at least one of stock prices, sales, revenues, costs, or profits) may be useful to the user. In another example use case, the title of the video conference is "sales presentation," the user is a salesperson of business software, and the other participants have email addresses associated with a business entity that is different from a business entity of the user. The server may determine that a sales pitch presentation explaining how the business software is preferable over competitors, including pricing and key performance indicator data, may be useful to the user. If additional information about the other participants is publicly available (e.g., on public social media pages or company webpages) the sales pitch presentation may be further tailored based on the information about the other participants. For example, if the other participants are located in France, the sales pitch presentation may highlight that French customer support is available, or that some members of the team that would be working with the potential buyer speak French. If the other participants are from a business entity that highly values community engagement, the sales pitch presentation may highlight the community engagement of the business entity selling the business software.

At 1006, the server transmits, to a messaging address of the user, a graphical output corresponding to the data. The graphical output may include the slide presentation. Alternatively, the graphical output may include a table or a graph that is not in a slide presentation.

Some implementations are described below as numbered examples (Example 1, 2, 3, etc.). These examples are provided as examples only and do not limit the other implementations disclosed herein.

Example 1 is a method, comprising: obtaining, from a client device, a data request specifying data for delivery, a delivery trigger, and a messaging address; obtaining, in response to occurrence of the delivery trigger, the data from a data repository; determining, using a federated artificial intelligence engine, a visualization format for the data; generating a graphical output corresponding to the data in the visualization format; and transmitting, to the messaging address, the graphical output.

In Example 2, the subject matter of Example 1 includes, determining occurrence of the delivery trigger by tracking, using a tracking engine that periodically accesses the data repository, changes to values stored in the data repository.

In Example 3, the subject matter of Examples 1-2 includes, wherein the visualization format comprises at least one of a table, a bar graph, a pie graph, or a line graph.

In Example 4, the subject matter of Examples 1-3 includes, wherein obtaining the data request comprises: determining that a user of the client device is scheduled to participate in a video conference, wherein the delivery trigger is determined based on a time of the video conference; determining, based on stored information about the video conference and using the federated artificial intelligence engine, data for presentation by the user in the video conference; and determining the data for delivery based on the data for presentation.

In Example 5, the subject matter of Examples 1~4 includes, generating, by the federated artificial intelligence engine, a slide presentation related to the data, wherein the slide presentation includes the graphical output; and transmitting the slide presentation, including the graphical output, to the messaging address.

In Example 6, the subject matter of Examples 1-5 includes, wherein the delivery trigger comprises a time.

In Example 7, the subject matter of Examples 1-6 includes, wherein the delivery trigger comprises a value stored in the data repository being within a predefined range.

In Example 8, the subject matter of Examples 1-7 includes, wherein the delivery trigger comprises a mathematical function of at least one value stored in the data repository being within a predefined range.

Example 9 is a non-transitory computer readable medium storing instructions operable to cause one or more processors to perform operations comprising: obtaining, from a client device, a data request specifying data for delivery, a delivery trigger, and a messaging address; obtaining, in response to occurrence of the delivery trigger, the data from a data repository; determining, using a federated artificial intelligence engine, a visualization format for the data; generating a graphical output corresponding to the data in the visualization format; and transmitting, to the messaging address, the graphical output.

In Example 10, the subject matter of Example 9 includes, wherein the visualization format comprises at least one of a bar graph, a pie graph, or a line graph.

In Example 11, the subject matter of Examples 9-10 includes, wherein obtaining the data request comprises: determining that a user of the client device is scheduled to participate in a video conference, wherein the delivery trigger is determined based on a time of the conference; determining, based on stored information about the video conference and using the federated artificial intelligence engine, data for presentation by the user in the conference; and determining the data for delivery based on the data for presentation.

In Example 12, the subject matter of Examples 9-11 includes, the operations further comprising: generating, by the federated artificial intelligence engine, a slideshow file related to the data, wherein the slideshow file includes the graphical output; and transmitting the slideshow file to the messaging address.

In Example 13, the subject matter of Examples 9-12 includes, wherein the delivery trigger is determined based on a time of a video conference.

In Example 14, the subject matter of Examples 9-13 includes, wherein the delivery trigger comprises a value stored in the data repository being within a range.

In Example 15, the subject matter of Examples 9-14 includes, wherein the delivery trigger comprises a mathematical function of at least one value stored in the data repository being within a range.

Example 16 is a system, comprising: a memory subsystem; and processing circuitry configured to execute instructions stored in the memory subsystem to: obtaining, from a client device, a data request specifying data for delivery, a delivery trigger, and a messaging address; obtaining, in response to occurrence of the delivery trigger, the data from a data repository; determining, using a federated artificial intelligence engine, a visualization format for the data; generating a graphical output corresponding to the data in the visualization format; and transmitting, to the messaging address, the graphical output.

In Example 17, the subject matter of Example 16 includes, wherein the visualization format comprises at least one of a table or graph.

In Example 18, the subject matter of Examples 16-17 includes, wherein obtaining the data request comprises: determining that a user of the client device is scheduled to participate in a video conference, wherein the delivery trigger is determined based on the video conference; determining data for presentation by the user in the video conference; and determining the data for delivery based on the data for presentation.

In Example 19, the subject matter of Examples 16-18 includes, the processing circuitry further configured to execute the instructions stored in the memory subsystem to: generate a slide presentation related to the data, wherein the slide presentation includes the graphical output; and transmit the slide presentation, including the graphical output, to the messaging address.

In Example 20, the subject matter of Examples 16-19 includes, wherein the delivery trigger comprises a time of a calendar event.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry. The memory subsystem may include a single memory unit or multiple joint or disjoint memory units, which each of the multiple joint or disjoint memory units storing all or a portion of the data described as being stored in the memory subsystem.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hardwired into processing circuitry. In some cases, an engine includes a combination of software stored in the memory subsystem and hardware that is hard-wired into the processing circuitry.

As used herein, the term "and/or" encompasses its plain and ordinary meaning and may refer to an intersection or a union of sets of data. For example, the phrase "A and/or B" encompasses the union of A and B. The phrase "A and/or B" encompasses the intersection of A and B.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

obtaining, from a client device, a data request specifying data for delivery, a delivery trigger, and a messaging address;

obtaining, in response to occurrence of the delivery trigger, the data from a data repository;

determining, using a federated artificial intelligence engine, a visualization format for the data, wherein the federated artificial intelligence engine comprises a plurality of different artificial intelligence engines that work together to analyze characteristics of the data and select the visualization format, wherein the plurality of different artificial intelligence engines comprise at least one language model and at least one convolutional neural network, wherein the plurality of different artificial intelligence engines work together to analyze the characteristics of the data and automatically select the visualization format based on one or more of statistical suitability, contextual relevance, and visual feature alignment;

generating a graphical output corresponding to the data in the visualization format; and transmitting, to the messaging address, the graphical output.

2. The method of claim 1, further comprising:

determining occurrence of the delivery trigger by tracking changes to values stored in the data repository using a tracking engine that periodically accesses the data repository.

3. The method of claim 1, wherein the visualization format comprises at least one of a table, a bar graph, a pie graph, or a line graph.

4. The method of claim 1, wherein obtaining the data request comprises:

determining that a user of the client device is scheduled to participate in a video conference, wherein the delivery trigger is determined based on a time of the video conference;

determining, based on stored information about the video conference and using the federated artificial intelligence engine, data for presentation by the user in the video conference; and determining the data for delivery based on the data for presentation.

5. The method of claim 1, further comprising:

generating, by the federated artificial intelligence engine, a slide presentation related to the data, wherein the slide presentation includes the graphical output; and transmitting the slide presentation, including the graphical output, to the messaging address.

6. The method of claim 1, wherein the delivery trigger comprises a time.

7. The method of claim 1, wherein the delivery trigger comprises a value stored in the data repository being within a predefined range.

8. The method of claim 1, wherein the delivery trigger comprises a mathematical function of at least one value stored in the data repository being within a predefined range.

9. The method of claim 1, wherein the data is identified based on stored information about a scheduled video conference and is to be presented by a user during the video conference, wherein the visualization format comprises a slideshow presentation, wherein the slideshow presentation includes a first slide comprising a data visualization comprising at least one of a table, bar graph, pie graph, or line graph and a second slide comprising natural language text describing the data visualization, and wherein the slideshow presentation is transmitted to the user for review or editing before the video conference.

10. The method of claim 1, wherein determining the visualization format comprises:

performing, using the at least one language model, data analysis and preparation;

performing, using the at least one convolutional neural network, feature extraction; and determining, using the federated artificial intelligence engine, the visualization format based on the data analysis, the preparation, and the feature extraction.

11. A non-transitory computer readable medium storing instructions operable to cause one or more processors to perform operations comprising:

obtaining, from a client device, a data request specifying data for delivery, a delivery trigger, and a messaging address;

obtaining, in response to occurrence of the delivery trigger, the data from a data repository;

determining, using a federated artificial intelligence engine, a visualization format for the data, wherein the federated artificial intelligence engine comprises a plurality of different artificial intelligence engines that work together to analyze characteristics of the data and select the visualization format, wherein the plurality of different artificial intelligence engines comprise at least one language model and at least one convolutional neural network, wherein the plurality of different artificial intelligence engines work together to analyze the characteristics of the data and automatically select the visualization format based on one or more of statistical suitability, contextual relevance, and visual feature alignment;

generating a graphical output corresponding to the data in the visualization format; and transmitting, to the messaging address, the graphical output.

12. The non-transitory computer readable medium of claim 11, wherein the visualization format comprises at least one of a bar graph, a pie graph, or a line graph.

13. The non-transitory computer readable medium of claim 11, wherein obtaining the data request comprises:

determining that a user of the client device is scheduled to participate in a video conference, wherein the delivery trigger is determined based on a time of the video conference;

determining, based on stored information about the video conference and using the federated artificial intelligence engine, data for presentation by the user in the conference; and determining the data for delivery based on the data for presentation.

14. The non-transitory computer readable medium of claim 11, the operations further comprising:

generating, by the federated artificial intelligence engine, a slideshow file related to the data, wherein the slideshow file includes the graphical output; and transmitting the slideshow file to the messaging address.

15. The non-transitory computer readable medium of claim 11, wherein the delivery trigger is determined based on a time of a video conference.

16. The non-transitory computer readable medium of claim 11, wherein the delivery trigger comprises a value stored in the data repository being within a range.

17. The non-transitory computer readable medium of claim 11, wherein the delivery trigger comprises a mathematical function of at least one value stored in the data repository being within a range.

18. A system, comprising:

a memory subsystem; and processing circuitry configured to execute instructions stored in the memory subsystem to:

obtaining, from a client device, a data request specifying data for delivery, a delivery trigger, and a messaging address;

obtaining, in response to occurrence of the delivery trigger, the data from a data repository;

determining, using a federated artificial intelligence engine, a visualization format for the data, wherein the federated artificial intelligence engine comprises a plurality of different artificial intelligence engines that work together to analyze characteristics of the data and select the visualization format, wherein the plurality of different artificial intelligence engines comprise at least one language model and at least one convolutional neural network, wherein the plurality of different artificial intelligence engines work together to analyze the characteristics of the data and automatically select the visualization format based on one or more of statistical suitability, contextual relevance, and visual feature alignment;

generating a graphical output corresponding to the data in the visualization format; and transmitting, to the messaging address, the graphical output.

19. The system of claim 18, wherein the visualization format comprises at least one of a table or graph.

20. The system of claim 18, wherein obtaining the data request comprises:

determining that a user of the client device is scheduled to participate in a video conference, wherein the delivery trigger is determined based on the video conference;

determining data for presentation by the user in the video conference; and determining the data for delivery based on the data for presentation.

21. The system of claim 18, the processing circuitry further configured to execute the instructions stored in the memory subsystem to:

generate a slide presentation related to the data, wherein the slide presentation includes the graphical output; and transmit the slide presentation, including the graphical output, to the messaging address.

22. The system of claim 18, wherein the delivery trigger comprises a time of a calendar event.

* * * * *